United States Patent [19]

Dexheimer

[11] Patent Number: 4,503,212

[45] Date of Patent: Mar. 5, 1985

[54] SULFONE POLYMER LUBRICANTS OF IMPROVED OXIDATIVE STABILITY

[75] Inventor: Edward M. Dexheimer, Grosse Ile, Mich.

[73] Assignee: Wyandotte Corporation, Wyandotte, Mich.

[21] Appl. No.: 446,436

[22] Filed: Dec. 3, 1982

[51] Int. Cl.[3] .................... C08G 75/20; C08G 75/23
[52] U.S. Cl. ...................................... 528/99; 428/500
[58] Field of Search .................. 528/99, 171; 568/33; 428/500

[56] References Cited

U.S. PATENT DOCUMENTS

| | | | |
|---|---|---|---|
| 2,602,060 | 7/1952 | De Groote | 528/99 |
| 3,364,178 | 1/1968 | Kreps et al. | 528/99 |
| 3,733,305 | 5/1973 | Loewrigkeit et al. | 528/99 |
| 3,767,618 | 10/1973 | Hairston et al. | 528/99 |

*Primary Examiner*—Lester L. Lee
*Attorney, Agent, or Firm*—Bernhard R. Swick

[57] ABSTRACT

The process and polyoxyalkylene compound prepared by reacting a dihydroxydiphenylsulfone with at least one alkylene oxide in the presence of a catalyst.

8 Claims, No Drawings

SULFONE POLYMER LUBRICANTS OF IMPROVED OXIDATIVE STABILITY

BACKGROUND OF THE INVENTION

1. Field of the Invention

This invention relates to polyalkylene oxide polymers and the use of these polymers as fiber and rubber lubricants. More particularly, this invention relates to polymers having an aromatic sulfone moiety incorporated into the polymers and of the use of these polymers as fiber and rubber lubricants having improved oxidative stability.

2. Description of the Prior Art

The conversion of nylon or polyester polymers into useful yarn for textile manufacture requires the use of a lubricant formulation called the "fiber finish" or "spin finish." The spin finish must control the yarn-to-metal friction to protect the newly spun fiber from fusion or breaks and, in the case of texturing, to insure that proper twist is transferred to the yarn. Synthetic fibers must be drawn and textured or bulked to yield optimum physical properties of strength, increased covering, pleasing hand, and greater warmth. During both texturing and bulking, the yarn is exposed to high temperatures. The demand for faster throughput is now requiring temperatures that approach 250° C. thus placing increased stress on the finish to protect the fiber.

It is known to use polyoxyalkylene compounds such as block and heteric polymers of ethylene oxide and propylene oxide as spin finishes for the production of synthetic yarns. Heteric and block polyoxyalkylene compounds particularly from ethylene oxide and propylene oxide derived by polymerization with initiators such as Bisphenol A and tetrahydrofuran are known as spin finishes for the production of synthetic yarns.

The rubber industry is also a major market for such polyoxyalkylene compounds. An important application is for use as a lubricant in the production of tires and rubber hose. In the latter case, it is used as a lubricant to allow easy removal of radiator type hose from the mandrels used to form the hose during vulcanization.

A successful mandrel lubricant must provide good lubricity, be relatively oxidation resistant, produce minimal smoke, either be easily removed from the finished product or not leave a sticky residue, and show a low toxicity. Oxidative stability is important since the lubricant must survive the vulcanization process where the rubber is cured into the hose shape.

The rubber lubricant is often washed off the finished article and then recycled for reuse. Since the rubber hose is reinforced with fibers such as rayon or nylon the lubricant must not form decomposition products that will attack these fibers.

Currently acceptable oxidation stability is achieved by heavily stabilizing the polyoxyalkylene glycol with an antioxidant such as phenothiazine. However, this approach suffers from at least three problems, many antioxidants are moderately toxic, they may show only limited solubility in polyoxyalkylene glycol and, finally, they may decompose to strong acids which can hydrolyze the reinforcing fiber.

U.S. Pat. No. 4,094,797 discloses oxidation stable heteric or block copolymer polyoxyalkylene compositions suitable for the treatment of thermoplastic fibers, particularly polyester and nylon fibers, prior to the processing of such fibers. The polyoxyalkylene compounds are derived from lower alkylene oxides and can be initiated with a difunctional aromatic compound containing reactive hydrogens such as dihydroxyphenol and are capped on at least one end of the chain with an alpha-olefin epoxide or mixtures thereof. U.S. Pat. No. 4,134,841 discloses a fiber lubricant composition of enhanced heat stability which comprises a nonhindered polyphenol stabilizer and a polyether lubricant. The *4,4'-Thiodiphenol Technical Bulletin* published by Crown Zellerbach, Chemical Products Division, Camas, Washington, discloses 4,4'-sulfonyldiphenol, a dihydroxydiphenylsulfone, which is the initiator for the compound of the instant invention.

SUMMARY OF THE INVENTION

In accordance with the instant invention, fiber and rubber lubricants of improved oxidative stability are prepared which comprise a polyoxyalkylene polymer having the generalized formula

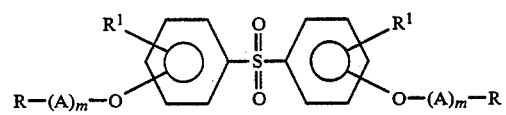

wherein A is an oxyalkylene group selected from oxyethylene, oxypropylene, oxybutylene, oxytetramethylene and heteric and block mixtures thereof; m is a whole number selected to give an overall molecular weight of the product of 600 to 15,000, R is selected from the group consisting of H, $C_1$–$C_{20}$ aliphatic group and

R' is hydrogen, halogen, an alkyl radical of 1 to 20 carbon atoms, or a carboxyl group and R" is H or $C_1$ to $C_{20}$ aliphatic group; and wherein R, R' and R" as appearing in the above formula may each be the same or different; and m in each instance may be the same or different. In accordance with the instant invention, each of the R—(A)$_m$—O— groups may be in either the ortho-, meta- or para-position.

DESCRIPTION OF THE PREFERRED EMBODIMENT

In a preferred embodiment of the invention, A comprises oxyethylene groups and groups selected from oxypropylene and oxybutylene wherein the oxyethylene groups are attached to the oxygen that is attached to the phenyl group and the oxypropylene or oxybutylene groups are attached at the opposite end of the oxyethylene groups.

In another preferred embodiment A comprises oxyethylene groups and groups selected from oxypropylene and oxybutylene groups wherein said oxypropylene or oxybutylene groups are attached to the oxygen that in turn is attached to the phenyl groups and the oxyethylene groups are attached at the opposite end of the oxypropylene or oxybutylene groups. The molecular weight of the final product is from about 600 to 15,000. For use as a fiber or rubber lubricant, the above-described polyalkylene oxide polymer may be used alone or in admixture with other fiber or rubber lubricants or with water or conventional solvents.

The compound of the invention is prepared by reacting in the presence of a catalyst a dihydroxydiphenyl sulfone with the alkylene oxide, or with a mixture of alkylene oxides where more than one is employed, or sequentially first with one alkylene oxide than the other, such as, for example, reaction first with propylene oxide followed by reaction with ethylene oxide. The dihydroxydiphenyl sulfone may be ortho-ortho, meta-meta, para-para, ortho-para, or any other combination of these isomers. Any conventional catalyst employed for oxyalkylation may be employed such as potassium hydroxide, sodium hydroxide, boron trifluoride dietherate and any metal oxide.

Due to its high melting point, the dihydroxydiphenylsulfone may be first mixed with a suitable non-reactive solvent. As used herein, the expression "non-reactive solvent" means a solvent characterized by little or no reactivity with the reactants employed in the instant invention. It does not necessarily mean that the solvent is completely inert. Suitable non-reactive solvents include: dimethoxyethane, aromatic and aliphatic hydrocarbons such as toluene and heptane, fluorocarbons such as perfluorohexane, and ethers such as diethylene glycol dimethyl ether and polyoxyethylene-polyoxypropylene dimethyl ethers.

The reaction mixture contains by weight from about 20 to 100 percent of the dihydroxydiphenylsulfone, 0 to 80 percent of the non-reactive solvent and about 0.01 to 5.0 percent catalyst. Where a non-reactive solvent is employed, the minimum amount of solvent in the reaction mixture is about 10 percent by weight. In a preferred embodiment of the invention the reaction mixture contains by weight about 50 to 75 percent of the dihydroxydiphenylsulfone, 25 to 50 percent non-reactive solvent and about 0.05 to 1.0 percent catalyst. The mixture is heated to a temperature of from about 100° C. to 180° C. and evacuated to less than 10 millimeters of mercury. The preferred temperatures are from about 100° to 150° C. for ethoxylation and about 80° to 150° C. for propoxylation. After stripping for approximately 30 to 90 minutes, the vacuum is relieved to 0 to 5 psig with nitrogen and the alkylene oxide added over a period which may vary according to the other conditions. Preferably the time required is about 5 to 15 hours. The reaction then proceeds until a constant pressure is observed which requires from about 1 to 10 hours. The amount of alkylene oxide, or alkylene oxides as the case may be, ranges from about 12 to 200 moles alkylene oxide per mole of dihydroxydiphenylsulfone. The preferred compounds are prepared employing ethylene oxide, propylene oxide and butylene oxide either of which may be used alone, or the dihydroxydiphenylsulfone may be reacted with either a mixture of ethylene oxide and a $C_3$ to $C_5$ higher alkylene oxide or reacted sequentially with either the higher alkylene oxide followed by the ethylene oxide or vice versa. The mole ratio of higher alkylene oxide to ethylene oxide ranges from 0 to about 5 and preferably about 0.25 to 4.0 moles per mole of ethylene oxide.

The following examples further illustrate the various aspects of the invention. Where not otherwise specified throughout this specification and claims, temperatures are indicated in degrees centigrade and parts, percentages and proportions are by weight.

EXAMPLE 1

In order to form the catalytic amount of potassium salt necessary for ethoxylation without having water present to form glycols, the potassium salt of the sulfone was prepared first and then dried. A solution of 100 parts of a mixture of ortho and para dihydroxydiphenylsulfone dissolved in 500 parts by weight of absolute methanol was treated with 10 parts potassium hydroxide pellets and heated until a clear solution was formed. This solution was then concentrated to a sticky solid in a rotary evaporator and dried for two days under vacuum. Hot ethylene carbonate in amount of 440 parts was added in two portions to dissolve all of the salted sulfone and to aid in transfer to a one-liter flask. An additional 150 parts of the dihydroxydiphenylsulfone was then added, the solution stripped at 60° to 70° C. under vacuum for 15 minutes and then heated to 155° C. and maintained at that temperature for 5 hours. Initially the temperature was 165° C. for 30 minutes which produced a large amount of $CO_2$ whereby some of the ethylene carbonate was lost. For the final 10 minutes, the temperature was 170° C.

After standing four days, the product was placed under vacuum and heated slowly to 155° C. to remove the volatiles. 454.4 parts of the product was produced with a hydroxyl number of 238.2 which corresponds to a molecular weight of 471 or 5 moles of ethylene oxide per mole of the dihydroxydiphenylsulfone.

To a clean, dry autoclave was charged 320 parts of the ethoxylated dihydroxydiphenylsulfone and 6 parts of potassium hydroxide. After purging with nitrogen and pressure checking, this mixture was heated to 110° C. with agitation. Ethylene oxide was then added in an amount of about 1139 parts over a period of 4 hours at a pressure of about 70 psig.

The sulfone polyether produced had the following physical properties:
Smoke Point: 213° C.
Cloud Point Range: 54°–58°

EXAMPLE 2

The potassium salt of dihydroxydiphenylsulfone was prepared in a manner similar to that of Example 1 by dissolving 12 parts of potassium hydroxide in 400 ml of methanol, adding 275 parts of dihydroxydiphenylsulfone and drying.

To a clean, dry autoclave was charged 240.3 parts of the dihydroxydiphenylsulfone salt and 250 parts dimethoxyethane. The pressure rises in the presence of the solvent. After purging with nitrogen and pressure checking, this product was heated to 110° C. with agitation. Propylene oxide was then added in an amount of about 341.5 parts over a 1 hour period at a pressure of about 70 psig. A mixture of 1583.3 parts of ethylene oxide and 527.8 parts of propylene oxide was then added at a rate of 300 to 400 parts per hour and about 70 psig.

The sulfone polyether product had a smoke point of 172° C. and a cloud point of 20° C.

EXAMPLE 3

A sulfone polyether of this invention was prepared substantially as described in Example 2 from 642.4 parts of dihydroxydiphenylsulfone, 15 parts of 45 percent aqueous potassium hydroxide, 500 parts of 1,2-dimethoxyethane, 1792.7 parts propylene oxide and 365.0 parts of ethylene oxide.

The sulfone polyether had a cloud point of less than 0° and a smoke point of 177° C.

EXAMPLE 4

A sulfone polyether of this invention was prepared in the manner substantially as described in Example 2 from 774 parts of the reaction product of 275 parts dihydroxydiphenylsulfone and 12 parts potassium hydroxide. This was reacted in the presence of 30 parts of 45 percent aqueous potassium hydroxide with 826 parts propylene oxide, and 635 parts ethylene oxide. The product had a cloud point of 25° C. and a smoke point of 191° C.

761 parts of the above product was then further reacted with 1833 parts of ethylene oxide to produce a polyether having a cloud point of 85° C. and a smoke point of 193° C.

EXAMPLE 5

A polyamide polymer is fed into a screw extruder and heated to 290° C. The molten polymer is pumped under pressure of approximately 1000 psig through the capillary of a spinnerette plate. Freshly extruded filaments are put through a descending spinning tower into which air of 70° F. temperature and 65 percent relative humidity is admitted. The filaments are gathered into yarn and upon emerging from the spinning tower are coated with the fiber lubricant solution comprising 25 percent by weight of the product of Example 1 and 75 percent of water. The lubricant coating is applied to the yarn at a rate of 0.75 weight percent based on the weight of the yarn. The yarn is then wound into a package at a rate of about 2000 feet per minute. The resulting yarn is then drawn over a 0.5 inch diameter draw pin at a delivery rate of 1,536 feet per minute during which time the yarn passes over a heater maintained at 175° C.

EXAMPLE 6

This example illustrates the use of the compound of the instant invention in the molding of rubber.

Water is added to the compound prepared in accordance with Example 1 until a concentration of 37 percent of the compound of Example 1, balance water is obtained. Natural rubber in a green or uncured stage is molded around a metal form in the form of an automobile radiator hose by first dumping a scoop of the previously diluted compound of Example 1 onto a metal mandrel or form for molding a hose. The rubber is next applied around the metal mold together with several layers of rayon fabric reinforcement. The assembly is then placed in an autoclave in which it is heated to a temperature of 200° C. and is maintained at this temperature for a period of about 10 minutes in order to cure the rubber hose composition. The finished rubber hose is easily removed from the mandrel.

The embodiments of the invention in which an exclusive privilege or property is claimed are defined as follows:

1. A process for preparing a polyoxyalkylene compound comprising sequentially reacting a dihydroxydiphenyl sulfone with ethylene oxide and an alkylene oxide selected from the group consisting of propylene oxide and butylene oxide in the presence of a potassium hydroxide catalyst wherein the amount of said alkylene oxide is sufficient to give a final product having a molecular weight of from about 600 to 15,000.

2. The process of claim 1 wherein first a mixture of dihydroxydiphenylsulfone, catalyst and a solvent is heated followed by said alkylene oxide addition.

3. The process of claim 1 wherein said alkylene oxide selected from propylene oxide and butylene oxide is propylene oxide.

4. The process of claim 1 wherein the alkylene oxide selected from the group consisting of propylene oxide and butylene oxide is first reacted with the dihydroxydiphenylsulfone followed by reaction with the ethylene oxide.

5. The process of claim 1 wherein the dihydroxydiphenylsulfone is first reacted with the ethylene oxide followed by reaction with the alkylene oxide selected from the group consisting of propylene oxide and butylene oxide.

6. A polyoxyalkylene compound having the formula:

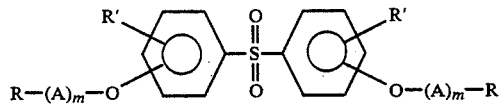

wherein A comprises oxyethylene groups and groups selected from oxypropylene and oxybutylene wherein the oxyethylene groups are attached to the oxygen that is attached to the phenyl group and the oxypropylene or oxybutylene groups are attached at the opposite end of the oxyethylene groups, m is a whole number selected to give an overall molecular weight of 600 to 15,000, R is selected from the group consisting of H, $C_1$ to $C_{20}$ aliphatic groups and

R' is H, halogen, an alkyl radical of 1 to 20 carbon atoms or a carboxyl group and R" is H or a $C_1$ to $C_{20}$ aliphatic group and wherein R, R' and R" may each be the same or different and m in each instance may be the same or different.

7. The compound of claim 6 wherein A comprises oxyethylene and oxypropylene groups.

8. A polyoxyalkylene compound having the formula:

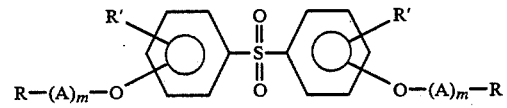

wherein A comprises oxyethylene groups and groups selected from oxypropylene and oxybutylene groups wherein said oxypropylene or oxybutylene groups are attached to the oxygen that in turn is attached to the phenyl groups and the oxyethylene groups are attached at the opposite end of the oxypropylene or oxybutylene groups, m is a whole number selected to give an overall molecular weight of 600 to 15,000, R is selected from the group consisting of H, $C_1$ to $C_{20}$ aliphatic groups and

R' is H, halogen, an alkyl radical of 1 to 20 carbon atoms or a carboxyl group and R" is H or a $C_1$ to $C_{20}$ aliphatic group and wherein R, R' and R" may each be the same or different and m in each instance may be the same or different.

* * * * *

UNITED STATES PATENT AND TRADEMARK OFFICE
CERTIFICATE OF CORRECTION

PATENT NO. : 4,503,212

DATED : March 5, 1985

INVENTOR(S) : EDWARD M. DEXHEIMER

It is certified that error appears in the above-identified patent and that said Letters Patent is hereby corrected as shown below:

First page, under Code 73 "Assignee", correct name to

BASF Wyandotte Corporation, Wyandotte, Michigan.

Signed and Sealed this

Fifteenth Day of October 1985

[SEAL]

Attest:

DONALD J. QUIGG

Attesting Officer

Commissioner of Patents and Trademarks—Designate